United States Patent
Pomeroy et al.

(10) Patent No.: US 9,779,265 B1
(45) Date of Patent: *Oct. 3, 2017

(54) ENCRYPTION KEY EFFECTIVE DATE

(71) Applicant: American Express Travel Related Services Company, Inc., New York, NY (US)

(72) Inventors: Allan Christopher Pomeroy, Coral Springs, FL (US); Philip John Lundrigan, Weston, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,539

(22) Filed: Jun. 16, 2017

Related U.S. Application Data

(63) Continuation of application No. 14/682,813, filed on Apr. 9, 2015, now Pat. No. 9,710,667.

(51) Int. Cl.
*G06F 21/62* (2013.01)
*G06F 21/60* (2013.01)
*H04L 9/08* (2006.01)

(52) U.S. Cl.
CPC ........ *G06F 21/6227* (2013.01); *G06F 21/602* (2013.01); *H04L 9/0891* (2013.01)

(58) Field of Classification Search
None
See application file for complete search history.

(56) References Cited

U.S. PATENT DOCUMENTS

| | | | |
|---|---|---|---|
| 9,710,667 B2 * | 7/2017 | Pomeroy | G06F 21/6227 |
| 2005/0203856 A1 | 9/2005 | Russell | |
| 2012/0143770 A1 | 6/2012 | Pauker | |
| 2013/0198525 A1 | 8/2013 | Spies et al. | |
| 2014/0237243 A1 | 8/2014 | Ma | |

* cited by examiner

*Primary Examiner* — Michael R Vaughan
(74) *Attorney, Agent, or Firm* — Snell & Wilmer L.L.P.

(57) ABSTRACT

The system may comprise receiving a data element, and receiving an encryption key and an associated encryption key identifier from an encryption keystore database. The system may further comprise transmitting the data element to an encryption module for encryption using the encryption key to form an encrypted data element. The system may also comprise receiving the encrypted data element from the encryption module and concatenating the encryption key identifier with the encrypted data element to form a protected data field entry.

17 Claims, 4 Drawing Sheets

ENCRYPTION KEY EFFECTIVE DATE

CROSS-REFERENCE TO RELATED APPLICATIONS

This application is a continuation of, claims priority to and the benefit of, U.S. Ser. No. 14/682,813 filed Apr. 9, 2015 and entitled "SYSTEM AND METHOD FOR ONLINE KEY ROTATION," which is incorporated herein in its entirety.

FIELD CROSS-REFERENCE TO RELATED APPLICATIONS

The present disclosure relates to systems and methods for encryption keys and protecting data.

BACKGROUND

The state of the art of encryption and encryption keys allows for encrypting data prior to transmitting the data to a database. The data is then decrypted, upon retrieval from the database, for display on an application for a user.

SUMMARY

A system and method for protecting data is provided. According to various embodiments, the system and method may comprise receiving (by a computer based system configured for protecting data) a data element. The system and method may comprise receiving an encryption key and an associated encryption key identifier from an encryption keystore database, and transmitting the data element to an encryption module for encryption using the encryption key to form an encrypted data element. The system and method may further comprise receiving the encrypted data element from the encryption module, and concatenating the encryption key identifier with the encrypted data element to form a protected data field entry.

The encryption key identifier may be prepended to the encrypted data element to form the protected data field entry. The system and method may comprise storing a delimiter between the encryption key identifier and the encrypted data element in the protected data field entry. The encryption key identifier may be stored in clear text. The system and method may further comprise storing an effective date in the encryption keystore database and associating the effective date with each encryption key based on a date each data element was encrypted via the encryption key. The effective date may be the encryption key identifier. The system and method may further comprise reading the encryption key identifier.

The system and method may comprise retrieving an encryption key associated with the identified encryption key identifier stored in the encryption keystore database, transmitting the retrieved encryption key and the protected data field entry to a decryption module to decrypt the encrypted data element, and receiving the decrypted encrypted text portion. The system and method may further comprise storing an encryption key identifier in the keystore database and associating the encryption key identifier with each encryption key.

According to various embodiments, a system and method may comprise retrieving a data field entry comprising a clear text portion and an encrypted text portion. The system and method may comprise reading a clear text encryption key identifier, and retrieving an encryption key associated with the read encryption key ID stored in a keystore database. The system and method may further comprise transmitting the retrieved encryption key and the data field entry to a decryption module to decrypt the encrypted data element, and receiving the decrypted encrypted text portion. The encryption key identifier may be prepended to the encrypted text portion to form the data field entry comprising the clear text portion and the encrypted text portion. The system and method may comprise storing a delimiter between the encryption key identifier and the encrypted text portion. The encryption key may be stored in the data field entry in clear text.

The system and method may comprise storing an effective date in the keystore database and associating the effective date with each encryption key based on a date each data element was encrypted via the encryption key. The effective date may be the encryption key identifier. The system and method may comprise storing an encryption key identifier in the keystore database and associating the encryption key identifier with each encryption key.

According to various embodiments, a system and method may comprise executing a batch job of encryption key changes via a database transaction, and selecting an encrypted data record comprising a clear text portion and an encrypted text portion. The system and method may further comprise reading a clear text encryption key identifier, and referencing a keystore database for the read encryption key identifier. The system and method may comprise identifying an encryption key of the plurality of encryption keys associated with the encryption key identifier and retrieving a new encryption key associated with a new encryption key identifier from the keystore database. The system and method may comprise transmitting the identified encryption key to a decryption/encryption module to decrypt the encrypted text portion of the encrypted data record, and transmitting the retrieved new encryption key to the decryption/encryption module to encrypt the decrypted data record via the new encryption key. The system and method may comprise concatenating the new encryption key identifier with the encrypted decrypted data record form a protected data field entry. The encrypted decrypted data record is encrypted via the new encryption key. The computer based system may comprise exclusive lock during the database transaction.

The system and method may comprise storing an effective date in the keystore database and associating the effective date with each encryption key based on a date each data element was encrypted via the encryption key. The effective date may be the encryption key identifier. The encryption key identifier may be prepended to the encrypted text portion to form a data field entry.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

According to various embodiments, a plaintext reference (e.g., an encryption key identifier) to the encryption key (aka a "key") used to encrypt a particular data item in a computer file or database may be stored along with the encrypted data item itself (e.g. in the same database field). This technique allows concurrent use of multiple encryption keys in the same file or database, which in turn allows the substitution of fresh encryption keys for expiring encryption keys without the need for an outage for the related software application(s).

Historically, software may be shut down for the duration of encryption key replacement, because the applications could use only one key at a time: either the expiring key or the new key. There was no way for a given application to tell whether a given data item was still encrypted with the expiring key or had been re-encrypted with the new key by the in-progress key rotation process.

According to various embodiments, an improved process related to the use of encryption keys is described herein. This may allow encryption keys to be rotated regularly without large scale software application outages. Within the Customer Service arena, this means data may be secured at rest while providing uninterrupted service to customers in situations where Customer Care Professionals are responding to real time customer service requests.

Figure 1:
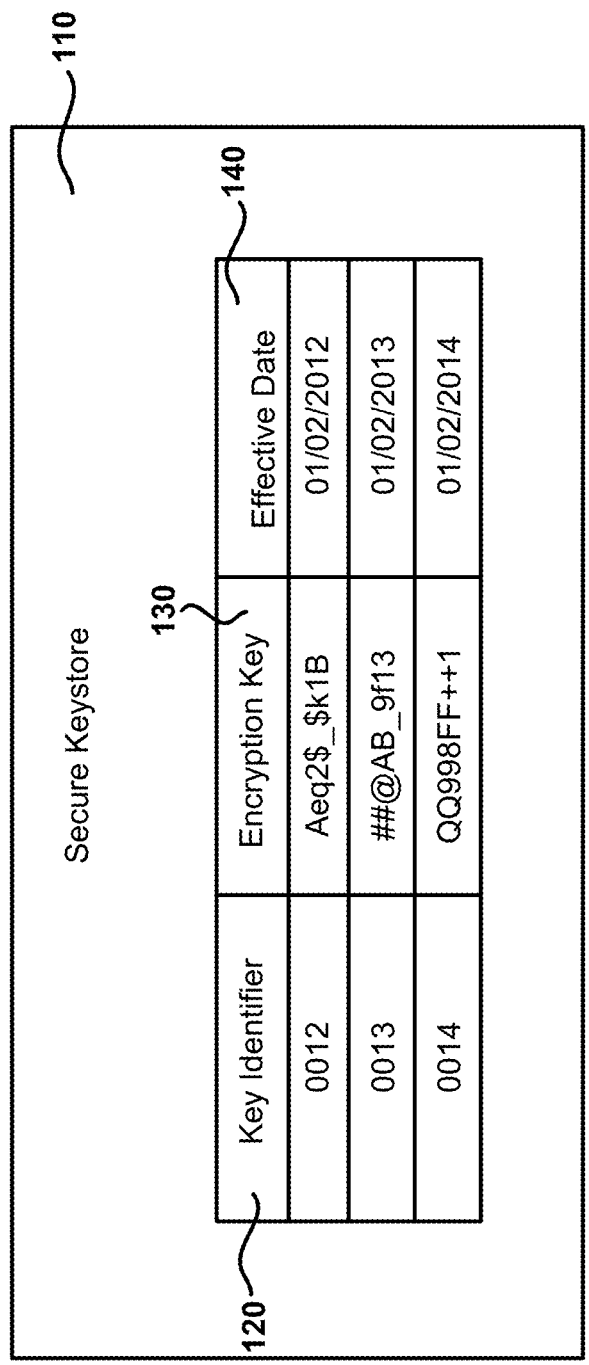
FIG. 1 illustrates a representation of a secure keystore, in accordance with various embodiments.

According to various embodiments and with reference to FIG. 1, an encryption key Identifier 120 ("ID") may be utilized to identify the encryption key 130 used to encrypt a particular data element. Encryption may include an encryption algorithm. The encryption algorithm may generate ciphertext that can only be read if decrypted. The encryption key 130 may be generated by the algorithm. An authorized recipient can easily decrypt the message with the encryption key. Unauthorized users may not be able to easily decrypt the message without the encryption key. The data element may be any desired data element. For instance, the data element may be a social security number, a password, a transaction account number, a birthday, a street address and/or the like. The encryption key ID 120 is not the encryption key 130. The encryption key ID 120 is stored alongside a data element and the actual encryption key in a secure keystore 110. Stated another way, the clear text encryption key ID 120 is concatenated with the encrypted data element (with brief reference to FIG. 2). The encryption module may be configured to retrieve the encryption key ID 120 and the corresponding key from the secure keystore 110 on startup and when instructed to do so as part of an encryption key 130 change. The secure keystore 110 is not stored in the application database. The secure keystore 110 is only accessible to users with the proper permissions, such as key administrators and the encryption/decryption module. The encryption key ID 120 is separate from the encryption key 130 itself.

By prepending and concatenating the encryption key ID 120 to the encrypted data element, a run time (designating an effective date) may be determined at decryption time, and thus a determination of which key to use may be made. According to various embodiments, the effective date may double as the encryption key ID 120, which may eliminate a separate encryption key ID 120 field.

Figure 2:
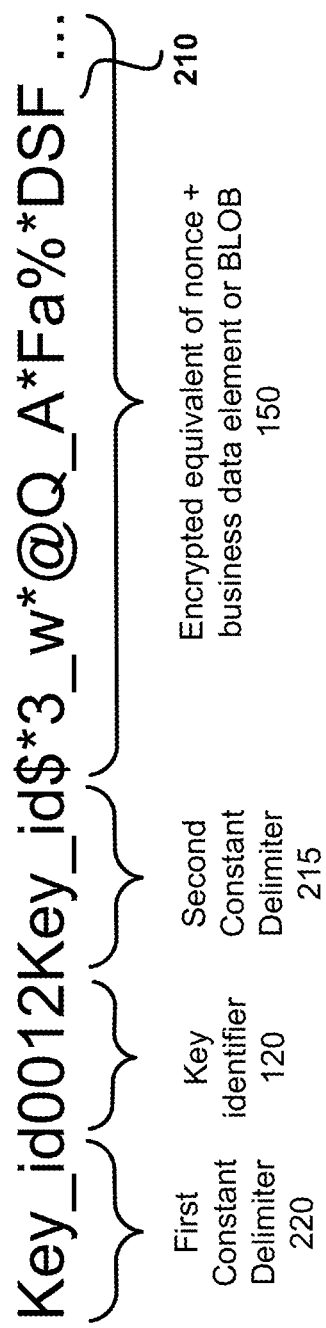
FIG. 2 illustrates a representation of concatenated protected data field entry including a clear text portion and an encrypted portion, in accordance with various embodiments.

According to various embodiments, and with reference to FIG. 2, a protected data field entry 210 is depicted. The protected data field entry 210 may comprise an encrypted key identifier 120 and an encrypted data element 150. The encryption key ID 120 may be stored in clear text, while the data element 150 may be encrypted. A delimiter (e.g., second delimiter 215) may be placed between the encryption key ID 120 and the data element 150. For instance, during encryption, a clear text encryption key ID 120 may prepend an encrypted the data element 150 and be stored in a database field. A delimiter 215 may be placed between the encryption key ID 120 and the data element 150. A delimiter 220 may be placed between each protected data field entry 210 and/or database field entry and/or each entry may begin with a delimiter 210.

Figure 3:
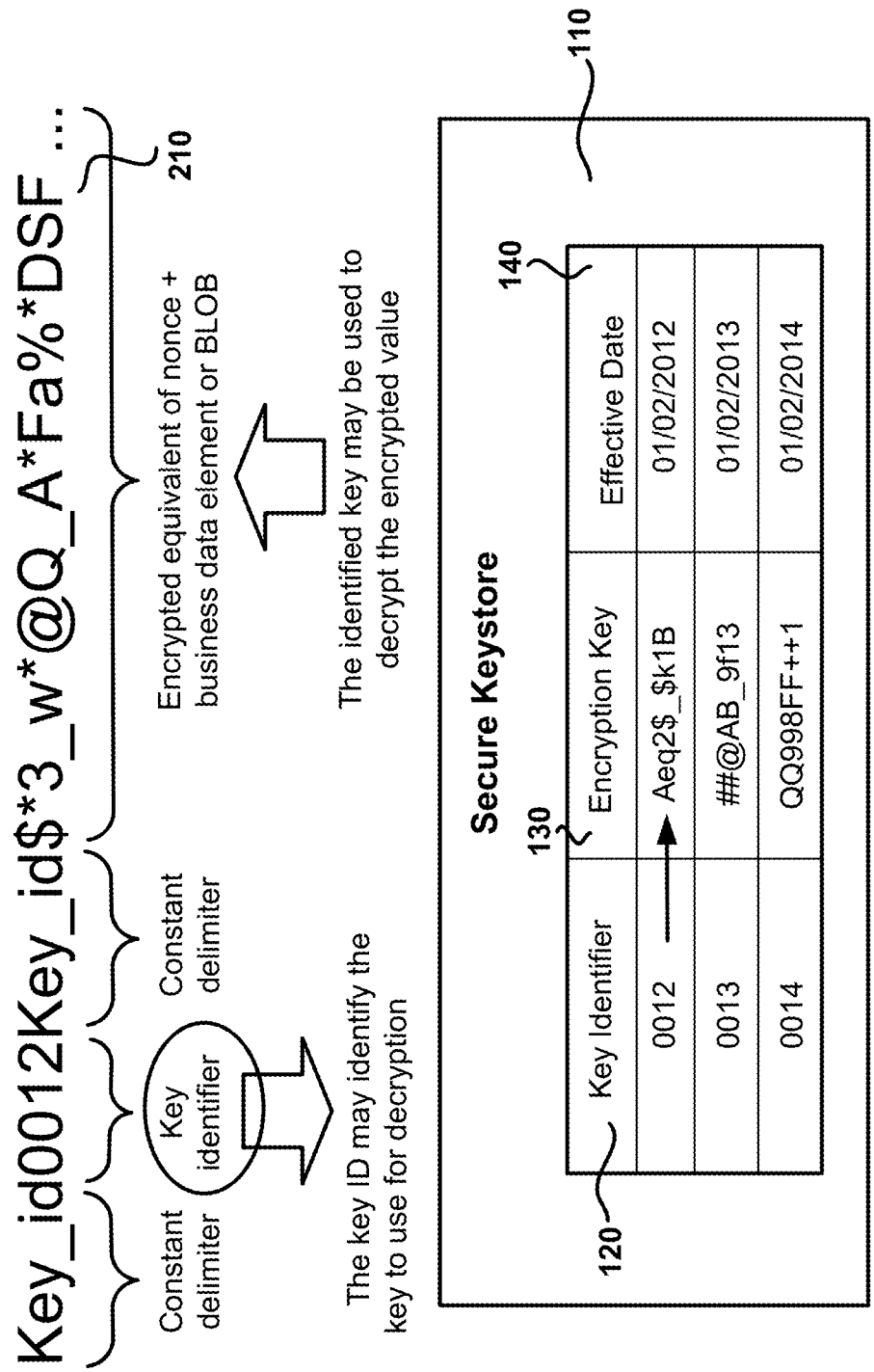
FIG. 3 illustrates a high level process for using the secure keystore to decrypt a data field entry, in accordance with various embodiments.

According to various embodiments, and with reference to FIG. 3, an available encryption key 130 may be used to encrypt a new data element. A corresponding encryption key ID 120 of the available encryption key 130 may be prepended to the encrypted data element 150 in the same field, such as to the right of the encrypted data element 150. The concatenated encryption key ID 120 and encrypted data element 150 may be stored as a combined result in a database field. A delimiter 215 (e.g., an underscore) signifies the end of the encryption key ID 120 and that the encrypted value 150 begins for the computer system.

According to various embodiments, and with reference to FIGS. 2 and 3, in decryption, a computer system may read a first delimiter 220 to identify that an encryption key ID 120 is what will follow. The computer system may read the clear text encryption key ID 120. The computer system will stop reading the encryption key ID 120 upon incurring a second delimiter 215. The computer system may access a keystore 110 to match the identified encryption key ID 120 with an encryption key ID 120 stored in the database. The computer system may then read the encryption key 130 associated with the identified encryption key ID 120. The computer system may then utilize the encryption key 130 to decrypt the encrypted data element 150 to a clear text status.

From time to time, changes to the encryption keys 130 may be desired. For instance, batches of encryption key 130 may be exposed due to inadvertent and/or nefarious actions. According to various embodiments, encryption key 130 changes may be made without incurring an application outage. Initially, a new key is specified. The encryption key 130 and a corresponding encryption key ID 120 may be stored in secure keystore 110. Thus, the new encryption key 130 may be utilized for encryption for any newly encrypted data. However, the decryption service will use whichever encryption key 130 is associated with the encryption key ID 120 for existing stored data.

According to various embodiments, a batch job of encryption key 130 changes may be made. Thus, records in the table that contain encrypted data that was encrypted with an older encryption key 130 may be identified due to the clear text in the protected data field entry 210. Clear text (aka plaintext) may refer to the form of a message or data which is in a form that is immediately understandable to a human being without additional processing. A database transaction may ensue. A database transaction, as described herein, may be a mechanism in database that allows multiple actions to be performed while ensuring that those actions in that group of actions are completed successfully or none of the actions occur at all. A transaction boundary may be established for each database transaction. An exclusive lock may be established for each database transaction. An exclusive lock allows for the exclusive rights to change a stored protected data field entry 210.

For instance, an exclusive lock on a particular record may be acquired. The particular record may be decrypted in a batch job. This involves decrypting each encrypted value in the record using the encryption key 130 identified by the encryption key ID 120 stored with the encrypted value. For example, there might be three columns in a record each encrypted with different encryption keys 130 if they were written at different times. Using the secure keystore 110, each protected data field entry 210 may be decrypted using the clear text prepended encryption key ID 120. Next all of the data elements may be re-encrypted with a newly selected encryption key 130. A new encryption key ID 120 may be prepended to the beginning of each encrypted data element. The updated record may be written back to the database thus committing the database transaction. As used herein, commit may refer to all actions are complete that are desired or not at all, save everything in the database row being updated to the data base and release that exclusive lock. The data record is then available for others to access. This batch process may take less than about a $10^{th}$ of a second, such as about a few milliseconds. A second batch job affecting other data fields in the database may be performed concurrently or sequentially as desired. Thus, utilizing the process described herein, the entire database may be updated piecemeal without taking applications offline for an extended period. Encryption keys 130 may be updated as needed, such as every two years, every year, ever quarter, and/or the like.

Figure 4:
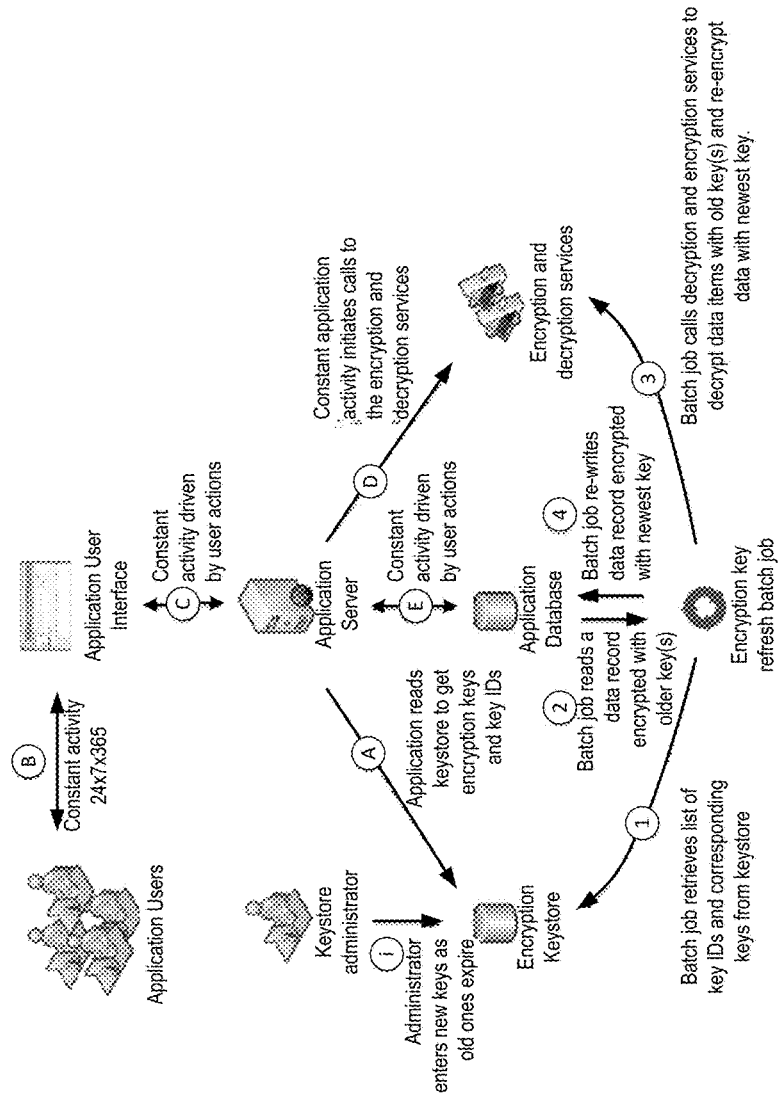
FIG. 4 illustrates a process flow for protecting data, in accordance with various embodiments.

According to various embodiments, and with reference to FIG. 4, a process flow is depicted. For instance, steps A, B, C, D, and E depict a flow of activity in the online application. Steps 1, 2, 3 and 4 may depict a key rotation batch flow. Steps 2, 3, and 4 are three actions which may occur in a loop. Each loop iteration may affect a data record and is executed inside a single database transaction. Step "i" represents an encryption key provisioning flow. For instance, a secure keystore 110 administrator may enter new keys 130 as old keys 130 expire into an application keystore 110. (step i). An application server may request encryption keys 130 and key IDs 120 from the encryption keystore 110 (Step A). Application users may be substantially constantly be interfacing with an application user interface (Step B). The application user interface may make calls upon the application server based on the activity of application users (Step C). The application server may initiate calls to encryption and decryption services (Step D). The application server may be in substantially constant communication with the application server. (Step E).

According to various embodiments, and with continued reference to FIG. 4, a refresh of the encryption keys 130 in a batch job may be performed at any time. A batch job may retrieve a list of key IDs 120 and corresponding keys 130 from the encryption keystore 110. The batch job may read a data record with encrypted older keys 130 from the application database. The batch job may call decryption and encryption services to decrypt data elements with the old keys 130 and re-encrypt the data elements with the newest key 130. The Batch job may re-write the data record encrypted with the new key 130.

Phrases and terms similar to "business," "service host" or "merchant" may be used interchangeably with each other and shall mean any person, entity, distributor system, software and/or hardware that is a provider, broker and/or any other entity in the distribution chain of goods or services. In this regard, the "business," "service host" or "merchant" may facilitate a real world or virtual interaction, transaction, exchange of information between a supplier of an item and a user.

Terms and phrases similar to "associate" and/or "associating" may include tagging, flagging, correlating, using a look-up table or any other method or system for indicating or creating a relationship between elements, such as, for example, (I) a transaction account and (ii) an item (e.g., offer, reward, discount) (iii) a digital channel, (iv) a service request, (v) a service host, and/or the like. Moreover, the associating may occur at any point, in response to any suitable action, event, or period of time. The associating may occur at pre-determined intervals, periodic, randomly, once, more than once, or in response to a suitable request or action.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a biometric, and the like.

The system may include or interface with any of the foregoing accounts, devices, and/or a transponder and reader in BLE communication with the transponder (which may include a fob), or communications between an initiator and a target enabled by short range communications protocols. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

A record associated with the transaction may, in addition, contain details such as location, merchant name or identifier, transaction amount, transaction date, account number, account security pin or code, account expiry date, and the like for the transaction.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.224). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
concatenating, by a computer based system, a first encryption key identifier with a first encrypted data element to form a protected data field entry;
associating, by the computer based system, an effective date with the first encryption key based on a date the first encrypted data element was encrypted via the first encryption key,
wherein the effective date is the first encryption key identifier,
wherein the effective date is stored in an encryption keystore database;
retrieving, by the computer based system and in response to an encryption key change based on the effective date, a second encryption key;
decrypting, by the computer based system and based on the first encryption key identifier, the first encrypted data element with the first encryption key to create a data element;
encrypting, by the computer based system, the data element with the second encryption key to create a second encrypted data element; and
prepending, by the computer based system, the second encryption key identifier to the second encrypted data element,
wherein the second encryption key identifier is stored in the encryption keystore database.

2. The method of claim 1, further comprising storing, by the computer based system, the effective date in the encryption keystore database.

3. The method of claim 1, further comprising receiving, by the computer based system, a first encryption key and the first encryption key identifier from the encryption keystore database.

4. The method of claim 1, further comprising:
transmitting, by the computer based system, the data element to an encryption module for encryption using a first encryption key to form the first encrypted data element; and
receiving, by the computer based system, the first encrypted data element from the encryption module.

5. The method of claim 1, wherein the first encryption key identifier is prepended to the first encrypted data element.

6. The method of claim 1, wherein the first encryption key identifier is prepended to the first encrypted data element to form the protected data field entry.

7. The method of claim 1, further comprising storing, by the computer based system, a delimiter between the first encryption key identifier and the first encrypted data element in the protected data field entry.

8. The method of claim 1, wherein the first encryption key identifier is stored in clear text.

9. The method of claim 1, further comprising:
reading, by the computer based system, the first encryption key identifier;
retrieving, by the computer based system, an encryption key associated with the read first encryption key identifier stored in the encryption keystore database;
transmitting, by the computer based system, the retrieved encryption key and the protected data field entry to a decryption module to decrypt the first encrypted data element; and
receiving, by the computer based system, the decrypted encrypted text portion.

10. A method comprising:
retrieving, by a computer based system, a first encryption key associated with a first clear text encryption key identifier stored in an encryption keystore database,
wherein the first clear text encryption key identifier is concatenated to an encrypted text portion to form a data field entry comprising a clear text portion and the encrypted text portion;
transmitting, by the computer based system, the first encryption key and a data field entry to a decryption module;
receiving, by the computer based system, a decryption of an encrypted text portion;
retrieving, by the computer based system and in response to an encryption key change based on an effective date, a second encryption key and a second clear text encryption key identifier;
encrypting, by the computer based system, the text portion with the second encryption key; and
prepending, by the computer based system, the second clear text encryption key identifier to the text portion encrypted with the second encryption key,
wherein the second clear text encryption key identifier is stored in the encryption keystore database.

11. The method of claim 10, wherein the effective date is the first clear text encryption key identifier.

12. The method of claim 10, wherein the first clear text encryption key identifier is prepended to the encrypted text portion of the data field entry.

13. The method of claim 10, wherein the first clear text encryption key identifier comprises the effective date of the first encryption key.

14. The method of claim 10, wherein the first clear text encryption key identifier is prepended to the encrypted text portion to form the data field entry comprising the clear text portion and the encrypted text portion.

15. The method of claim 10, further comprising storing, by the computer based system, a delimiter between the first clear text encryption key identifier and the encrypted text portion.

16. The method of claim 10, wherein the first encryption key is stored in the data field entry in clear text.

17. The method of claim 10, further comprising associating, by the computer based system, the effective date with each encryption key based on a date each data element was encrypted via the encryption key.

* * * * *